March 22, 1966 LE ROY R. BOGGS 3,241,701
SECTIONAL TANK
Filed March 16, 1962 8 Sheets-Sheet 1

INVENTOR
Le Roy R. Boggs
BY
ATTORNEYS

March 22, 1966 LE ROY R. BOGGS 3,241,701
SECTIONAL TANK
Filed March 16, 1962 8 Sheets-Sheet 4

INVENTOR
Le Roy R. Boggs
BY
ATTORNEYS

March 22, 1966  LE ROY R. BOGGS  3,241,701
SECTIONAL TANK

Filed March 16, 1962  8 Sheets-Sheet 5

INVENTOR
LeRoy R. Boggs
BY
ATTORNEYS

United States Patent Office 3,241,701
Patented Mar. 22, 1966

3,241,701
SECTIONAL TANK
Le Roy R. Boggs, Bristol, Tenn., assignor to Universal Moulded Fiber Glass Corp., Bristol, Va., a corporation of Delaware
Filed Mar. 16, 1962, Ser. No. 180,252
10 Claims. (Cl. 220—5)

This invention relates to tank type structures and also to a method for fabrication or construction of such tank structures.

Although the invention is of wide applicability, it is particularly useful in connection with relatively large tank type structures which cannot readily be completely fabricated in a plant or factory and then shipped in completed form to the location in which the tank is to be used. Examples of such structures are oil tanks, water tanks and silos. By way of example, the invention is herein illustrated and described as embodied in a silo adapted for the storage of feed or grain. Although various tanks which may be made in accordance with the invention may be of a variety of shapes, most of such structures are of substantially cylindrical shape, although the length and diameter may be varied widely, according to useage and purpose. In the case of a silo, for example, the length or height is ordinarily substantially greater than the diameter, although for many other purposes the diameter may be greater than the height.

As above noted, it is not practical to ship completed large size tank structures and with this thought in mind the present invention provides a type of structure and a method for constructing the tank which facilitates construction or assembly of the tank at the scene of use from parts of such form or shape as to be readily transported or shipped and which are also of such a nature as to be very readily produced according to mass production methods, particularly of a certain type hereinafter referred to.

Another object of the invention is to provide a tank type structure formed of plastic or resin material containing fibrous reinforcement, especially glass fiber reinforcement, and thereby providing a structure having a very favorable combination of characteristics or properties in relation to material costs. For instance this type of material for most purposes is highly weather-proof and does not require painting, it is not subject to corrosion nor to attack by many chemicals including constituents present even as a result of fermentation of silage and the like, commonly stored in silos. This type of material may also be readily fabricated or formed in panels, sheets or strips by the continuous forming operations as disclosed in my copending applications Serials Nos. 2760 filed Jan. 15, 1960, refiled on Nov. 3, 1964, under Serial Nos. 408,488, 115,633 filed June 8, 1961 and 138,350 filed Sept. 15, 1961, now Patent No. 3,185,746.

More specifically, the present invention contemplates the construction of a silo or other tank type structure by first fabricating or forming a plurality of panels in flat rectangular form, each panel being of length equal to the length or axial dimension of the silo and the plurality or group thereof when positioned edge-to-edge having a combined width equal to the circumference of the silo. In the construction of the silo, a group of these panels is shipped to the site and they are laid out on the ground in edge-to-edge relation and are fastened together at the adjoining edges. Thereafter, in a manner to be explained more fully herebelow, the panel assembly is rolled up to form the cylindrical wall of the silo. End closure members, such as a base and a lid of generally circular form are also provided and these are fastened to the ends of the cylindrical wall in order to complete the silo structure.

It is an object of the invention to provide a panel construction for use in making up the panel assembly and thus the side wall of the silo, which panel is provided with marginal flanges serving not only as a means for inter-connecting the panels in edge-to-edge relation but also as a means for reinforcement of the cylindrical wall of the completed silo or other tank. For this purpose the invention contemplates a certain special arrangement of fibrous reinforcement elements in the panel structure in the region of the flanged marginal edges, so as to provide a flange of great strength and also to provide additional reinforcement in the side wall of the tank in the region of the junction between the flange and the main portion of the panel.

Another object of the invention is to provide a novel arrangement of end closure members adapted to cooperate with the cylindrical wall made up of the panel assembly in order to provide an effective seal or joint between the end closure and the adjacent end of the cylindrical wall.

In accordance with another aspect of the invention, the end closure members are provided with certain generally cylindrical surfaces serving as the means on which the panel assembly is wound or flexed when the panel assembly is rolled up from its flat shape on the ground into the cylindrical shape of the silo or other tank being made.

Still further the invention contemplates other method features relating to the construction of tank type structures, including the provision of certain elements employed temporarily in the construction or assembly operation, and thereafter removed from the tank and transported to another site for the erection of a similar tank.

Because of their relatively light weight the use of resin materials facilitates the fabrication or construction of the silo in horizontal position on the ground and thereafter raising the silo to its normal vertical position. In contrast, most silos or similar tank structures must be constructed in the vertical position.

Another object of the invention is to provide a type of tank structure, utilizing a plurality of panels in the cylindrical wall, according to which with a given size and shape of panel, tanks of several different sizes can readily be fabricated, in which case end closure members of different diameters will, of course, be used.

Various of the objects and advantages set forth above contribute to facilitating construction of tanks by fabricating certain parts thereof in simple flat form and shipping such parts in that form to the site for use and then assembling the structure at that site, thus avoiding the necessity for shipment of large factory completed tank structures.

How the foregoing objects and advantages are obtained, together with others which will occur to those skilled in the art will appear more fully from the following description of the drawings which illustrate an embodiment of the invention in a silo and a method for constructing such a silo.

Figure 19:
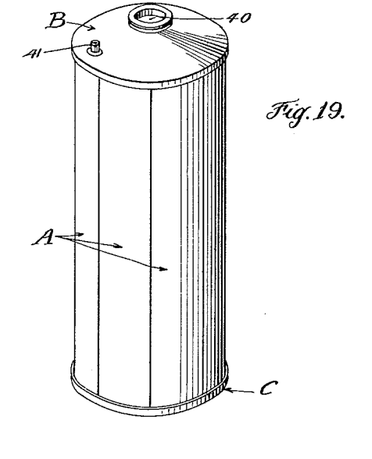
FIGURE 19 is an isometric view, on the scale of FIGURES 9 to 11, illustrating the completed silo.
Figure 20:
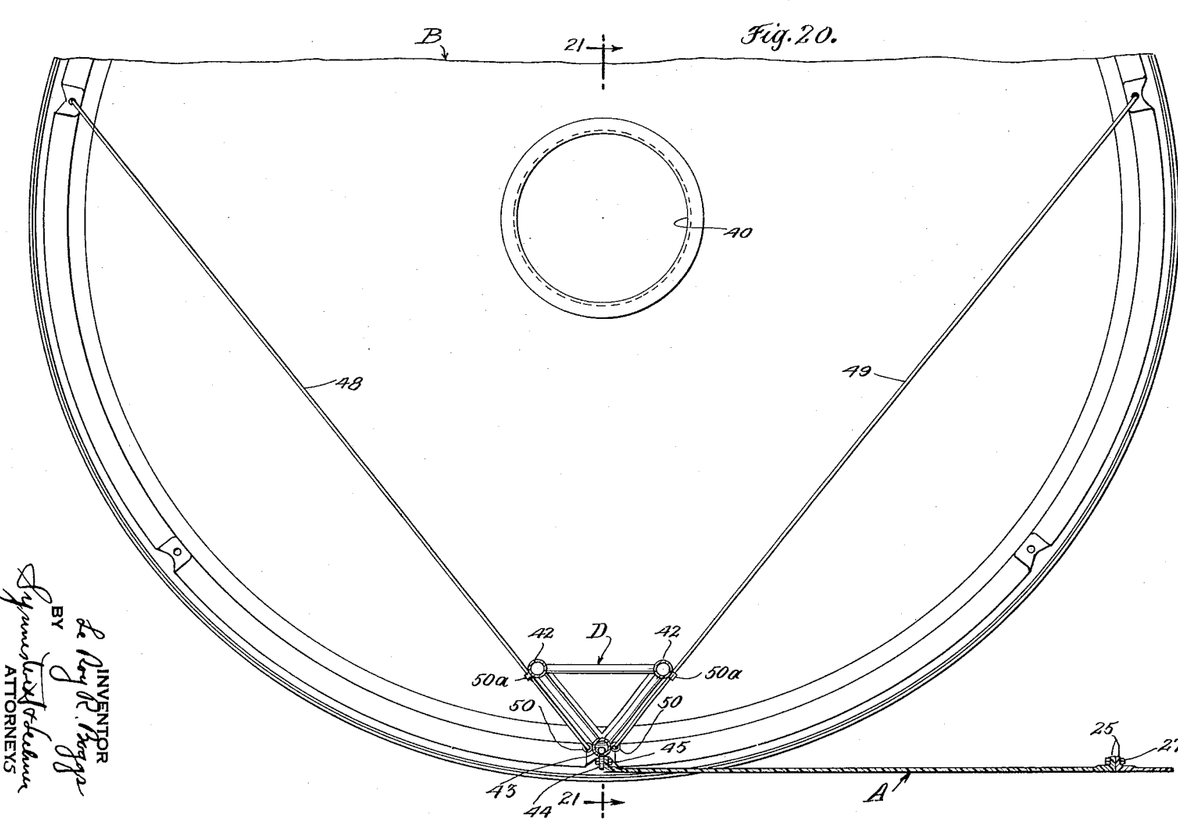
FIGURE 20 is an enlarged fragmentary sectional view taken as indicated by the line 20—20 on FIGURE 11 and showing certain details of the construction and attachment of parts temporarily employed during the assembly operation, as will further be described.

In general, a tank, such as the silo herein referred to, is illustrated in FIGURE 19, from which it will be seen that the side wall or cylindrical body of the silo is made up of a plurality of vertically disposed panels A, there being a circular top or lid B and a base C associated with the upper and lower ends of the cylindrical wall. The structure of the silo there illustrated is shown to better advantage in FIGURES 1 to 8 inclusive in which attention is directed to the following parts:

First, it will be noted that the group of panels of which the cylindrical wall is made up comprises 7 of such panels A, although it is to be understood that fewer or a larger number of panels can be used in accordance with the invention. These panels are formed as flat rectangular sheets having flanges 25 at opposite edges thereof.

Figure 7:
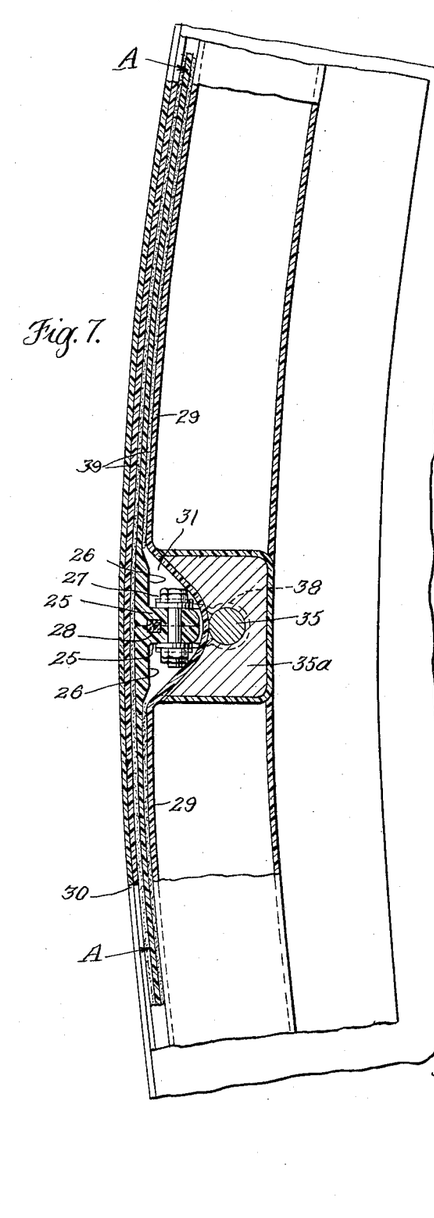
FIGURE 7 is an enlarged fragmentary plan section taken as indicated by the line 7—7 on FIGURE 2 and also as indicated by the line 7—7 applied to FIGURE 4, showing the panel joint construction in the region of the lid portion of the silo.
Figure 25:
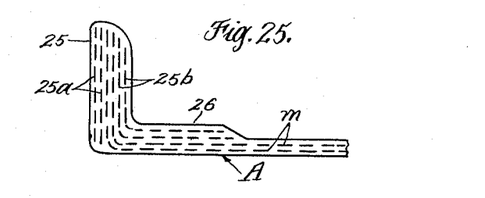
FIGURE 25 is a view showing the outline of a section through the flanged edge portion of a panel diagrammatically illustrating certain fiber reinforcements employed.

As seen in FIGURE 25, the wall of the panel incorporates reinforcement elements which may be of a variety of types but preferably fibrous and advantageously in the form of glass fiber mats for instance the two mats diagrammatically indicated at $m$, which preferably extend from the plane of the panel itself into the plane of the marginal flanges 25, these marginal flanges desirably incorporating additional plies or layers of reinforcement, for instance in the form of additional strips of glass fiber mats 25a and 25b, the first of which only in the plane of the flanges and the other of which extend into the plane of the panel wall itself, overlapping the reinforcement plies in the panel wall and thus providing a thickened or reinforced portion 26 near the edges of the panels, as clearly seen in FIGURE 25 and also in FIGURE 7. This is of importance for several reasons including the fact that the overlapping of the plies in the region of the flanges adds strength to the structure along the edges where the flanges connect with the panel wall. The thickened part 26 also contributes extra reinforcement in the region of the junction between the flanges 25 and the main wall of the panels.

The panels are conveniently formed in flat condition and are fixed and interconnected by bolts 27 cooperating with the panel flanges 25. Such panels comprise a sheet type of product which may readily be formed of glass fiber reinforced resin material by the technique disclosed in my copending applications above referred to. In a typical operation, such panel material is continuously produced and delivered from the apparatus for forming it, and is cut off beyond the discharge end of the apparatus at intervals in order to provide panels of the desired length.

Depending upon the usage of the silo or tank, the panel flanges 25 are provided with grooves or recesses cut or machined in the flanges and adapted to receive sealing material or a sealing strip such as indicated at 28, for instance a rubber gasket type element of round section somewhat compressed in the joint. This is of special importance where liquids are to be retained in the tank or silo. Such sealing will also reduce or substantially eliminate air or gas flow through the panel joints.

By this form of construction, and when employing a plurality of panels to make up the cylindrical wall of the silo, it is possible by varying the number of panels to employ the same panels for silos of different diameters.

Figure 1:
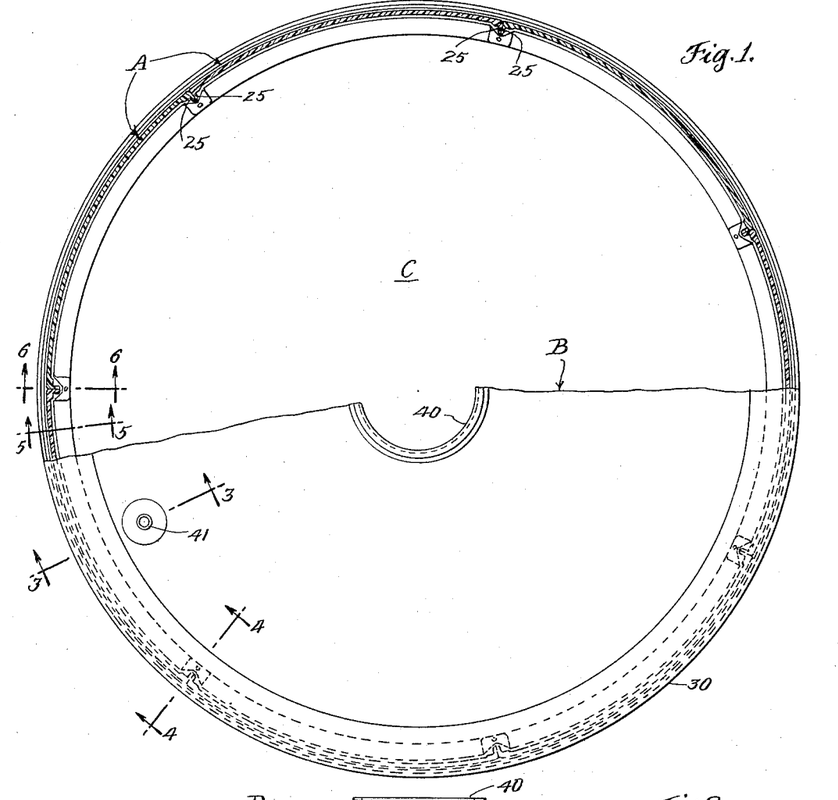
FIGURE 1 is in part a plan view and in part a plan section of a silo or similar tank constructed according to the invention.
Figure 2:
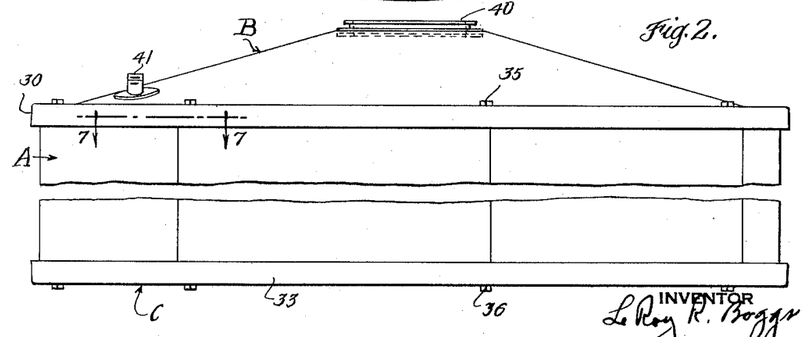
FIGURE 2 is an elevational view of the silo in FIGURE 1 with most of the cylindrical wall broken out in order to condense the figure.
Figure 3:
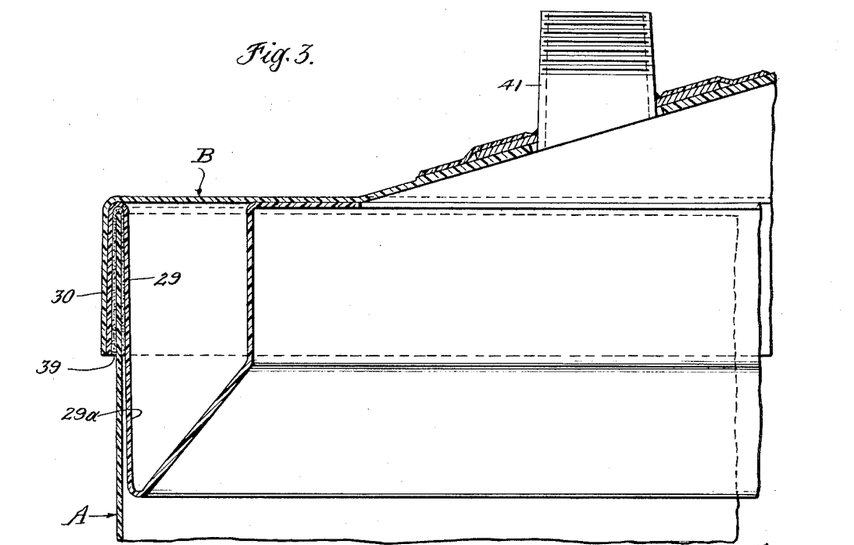
FIGURE 3 is a fragmentary enlarged sectional view at the upper end or lid closure portion of the silo, taken on the line 3—3 of FIGURE 1 at a point in the circumference between adjacent panel joints of the cylindrical side wall.
Figure 4:
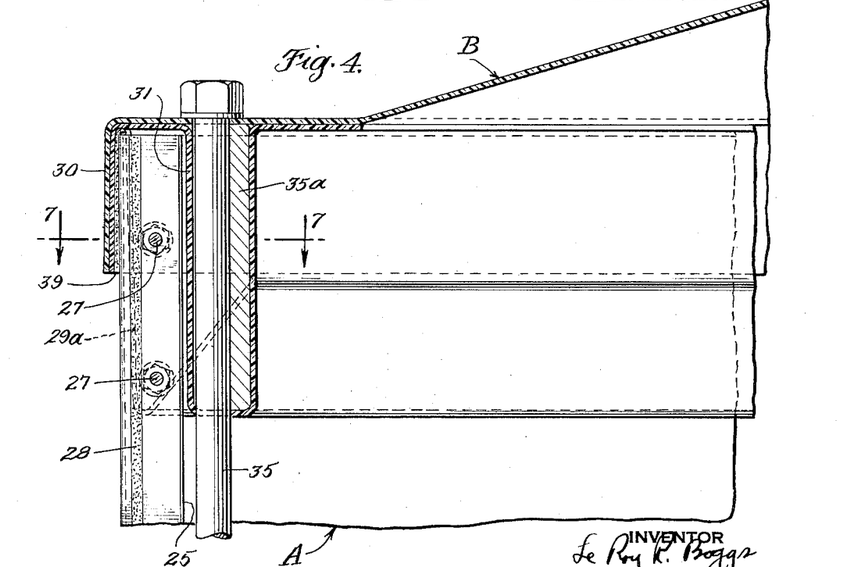
FIGURE 4 is a view similar to FIGURE 3 but taken on the line 4—4 of FIGURE 1, through one of the panel joints.

The upper end closure or lid B (see FIGURES 1 to 4 and 7) has a substantially cylindrical wall 29 around the periphery of the lid and also a wall element 30 which cooperate to form an annular groove in which the end of the cylindrical wall of the silo is received, as will be clear from inspection of FIGURE 3. The wall part 29 extends downwardly as indicated at 29a considerably below the annular groove formed between the parts 29 and 30 and this serves a functional related to the assembly of the structure, as will be explained more fully hereinafter. Although the wall 29–29a is generally cylindrical, it preferably has a slight taper so that the lower edge portion 29a is of progressively decreasing diameter, which also serves a purpose related to the assembly as will be explained more fully hereinafter. At intervals (see FIGURE 7) the wall 29 is curved inwardly or recessed as indicated at 31 in order to accommodate the flanged joints of the panels around the circumference of the silo. These recessed parts 31 extend upwardly substantially to the top of the lid, as will be seen in FIGURE 4, so as to accommodate the panel flanges 25 all the way to the upper end of the silo wall assembly.

Figure 5:
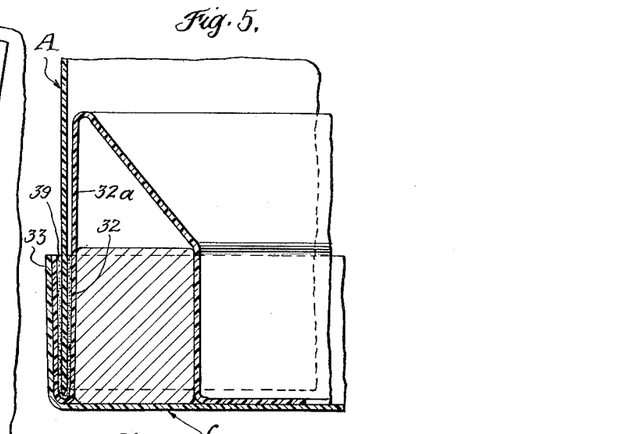
FIGURE 5 is a fragmentary view similar to FIGURE 3 but taken through the base or bottom end closure of the silo as indicated by the section line 5—5 on FIGURE 1.
Figures 6, 8:
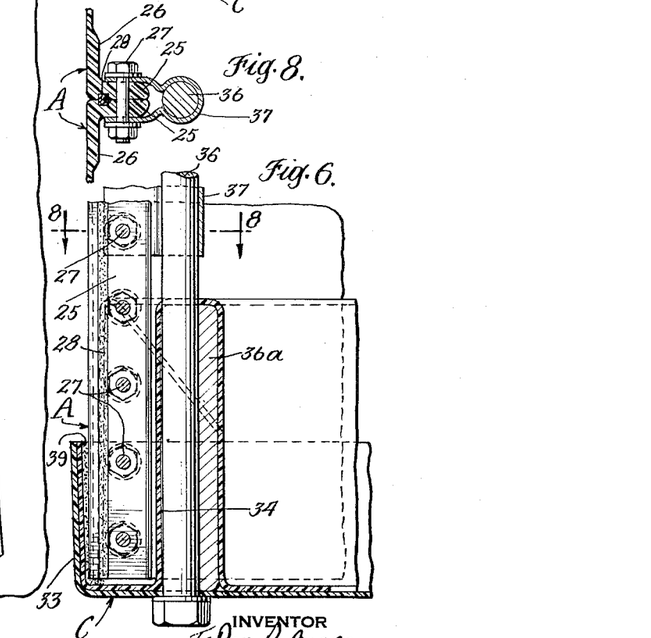
FIGURE 6 is another fragmentary view taken at the base end of the silo in the region of one of the panel joints as indicated by the section line 6—6 on FIGURE 1.
FIGURE 8 is a sectional view taken near the base end of the silo as indicated by the line 8—8 on FIGURE 6 and illustrating certain details in the region of a panel joint.

A similar type of construction including cylindrical wall 32 with an extension 32a and also the wall 33 is employed on the lower end or base closure member C as will be seen from FIGURES 5 and 6, the annular groove between the wall parts 32 and 33 also having pockets formed to accommodate the panel flanges by recessed parts 34 of the cylindrical wall 32–32a. Here again it will be noted that the wall 32–32a is somewhat tapered so that the upper edge thereof is of reduced diameter, for reasons which will be explained.

Figure 24:
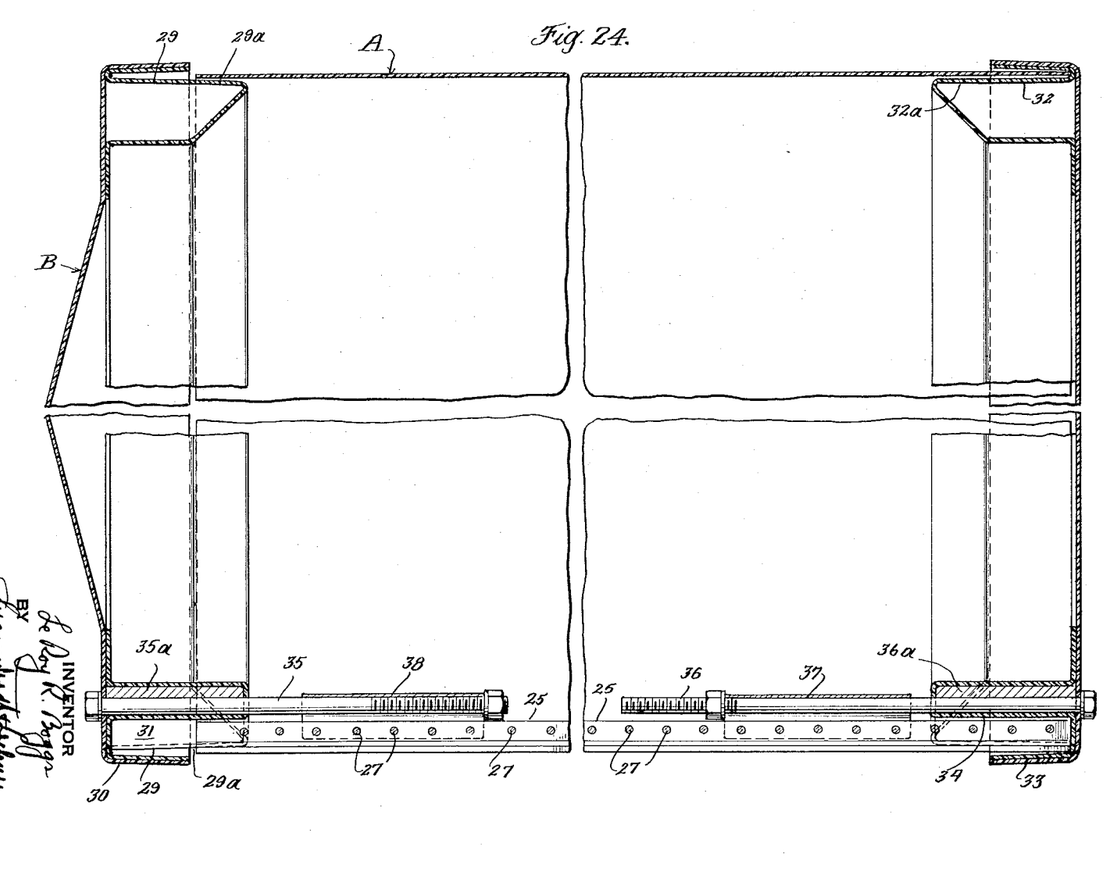
FIGURE 24 is a broken out longitudinal view through the lid portion, the cylindrical body and the base portion of the silo, this view further illustrating certain details of construction and also certain steps employed in the assembly operation.

Both the top and bottom end closure are adapted to be secured to the side wall of the silo by means of bolts indicated at 35 for the lid and at 36 for the bottom. At this point attention is also directed to the right hand lower portion of FIGURE 24 which shows the cooperation of the bolt 36 not only with the bottom closure itself but also with a clip 37 which is fastened to the panel flanges 25 by means of the bolts 27 in the region of the lower end of the silo. This clip further appears in FIGURES 6, 7 and 8. A similar clip shown at 38 in the left hand lower portion of FIGURE 24 is provided for the bolt 35 whereby the lid portion is fastened to the side wall.

As will be seen from FIGURES 3, 4, 7 and 24, the lid B is made up of several pieces, which may be in the form of sheet material, and while the lid may be made of metal, it is contemplated that the several elements of the lid be fabricated of resin material reinforced with glass fibers. These parts may be prepared by the well known hand lay-up process. As seen particularly in FIGURES 4 and 7, at intervals in the lid structure where the bolts 35 are associated therewith, blocks of wood or the like such as indicated at 35a are introduced in pockets between layers of sheet material, in order to provide a substantially solid structure against which the bolt may react.

The base closure for the silo is of similar construction to that described above for the lid, as will be seen from FIGURES 5, 6 and 24. In addition, wood blocks 36a may be provided in the region of the bolts 36, for the same purpose as mentioned above in connection with blocks 35a.

As seen in FIGURES 3 to 7 inclusive, the annular grooves for receiving the upper and lower edges of the cylindrical wall are filled with an adhesive material indicated at 39, acting to seal the joints between the lid and side wall and between the base and the side wall. Any of a variety of adhesive materials may be used for this purpose, for instance an epoxy resin, as referred to in my copending application Serial No. 123,209, filed July 11, 1961 which also discloses an applicator particularly useful for applying adhesives to a joint such as just described. The lid advantageously has a relatively large central opening or manhole as indicated at 40 in FIGURES 1 and 19 and in addition an opening or connection 41 may be provided and may be used alternatively to the opening 40 for filling or withdrawing materials from the interior of the silo.

The type of construction just described, particularly where the panels are made of glass fiber reinforced resin material comprises a very sturdy construction capable of withstanding relatively high pressures incident to loading the tank with various materials, even water. The joints provided by the flanges 25 and the thickened adjoining portions of the panels themselves are of great strength. The overall structure is capable of handling large capacity loads, without internal or external bracing, particularly in view of the reinforcement contributed by the structure of panels in the region of the flange joints and also in view of the described arrangement of fastenings by which the lid and base are secured to the cylindrical wall in the region of each of the joints between the abutting flanges of adjoining panels around the circumference of the silo.

Various steps in the method of assembling or construction of the silo are illustrated in FIGURES 9 to 24 inclusive. Of this group reference is first made to FIGURES 9, 10 and 11. As shown in those figures, the panels A to be used in forming the side wall of a silo are laid out flat, for instance on the ground, and with their marginal flanges 25 side by side. Bolts diagrammatically indicated at 27 are then employed to join the marginal flanges of the adjoining edges of the several panels so as to make up a panel assembly of width substantially equal to the height of the silo to be made and a length equal to the circumference of the silo to be made. In a typical installation as illustrated in the drawings, the side wall of the silo may be about 26 feet high, and about 11 feet in diameter.

Figure 9:
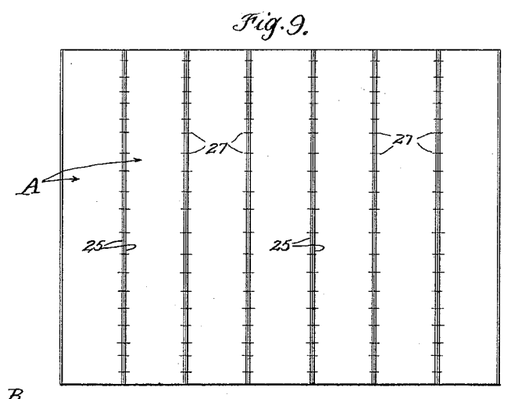
FIGURES 9, 10 and 11 are somewhat diagrammatic views on a much smaller scale than FIGURES 1 to 8 illustrating certain of the assembly or fabrication steps employed in the construction of the silo, these views especially showing the positioning of certain other parts in relation thereto in preparation for rolling up the panel assembly for forming the cylindrical wall of the silo.
Figure 10:
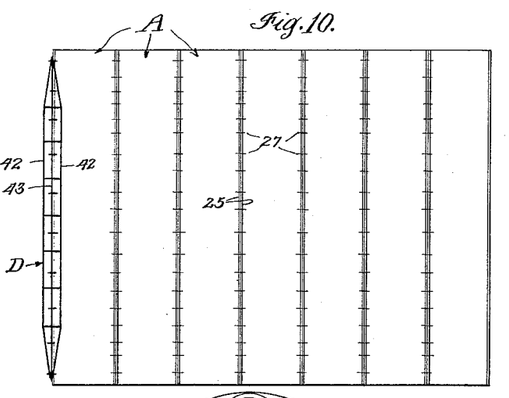
Figure 11:
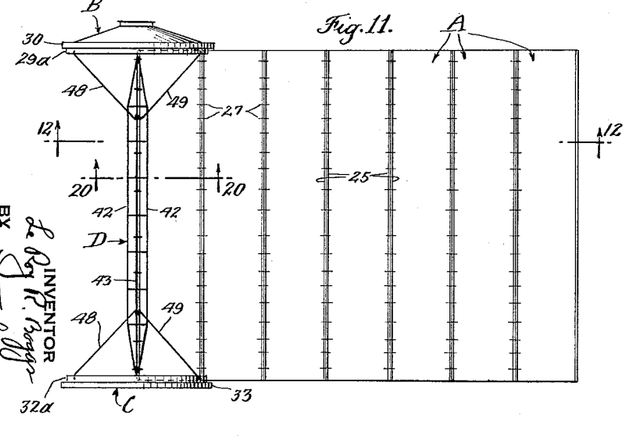
Figure 12:
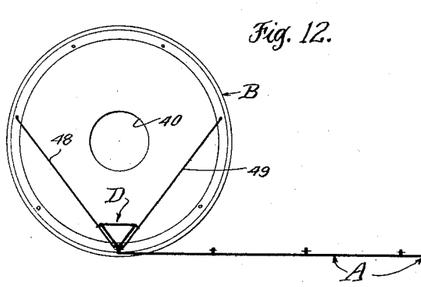
FIGURES 12 to 18 inclusive are somewhat diagrammatic views on a larger scale than FIGURES 9 to 11, illustrating a sequence of steps followed subsequent to the operations illustrated in FIGURES 9 to 11, in order to roll up and form the cylindrical wall of the silo from the flat panel assembly, these FIGURES 12 to 18 being taken as indicated by the line 12—12 on FIGURE 11.
Figure 13:
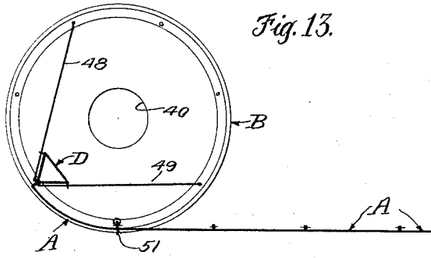

In an installation of the size just mentioned the panels may be of the order of ⅛ of an inch thick with flanges 25⅜ of an inch thick and with the reinforced part 26 at the panel edges in the neighborhood of ¼ inch thick. The flanges are drilled in advance to receive the securing bolts and where sealing of the joints is desired the grooves may be machined in advance so as to receive the sealing strips 28. The securing bolts are inserted in order to join the several panels into the panel assembly as indicated in FIGURES 9, 10 and 11. Where sealing elements 28 are employed, these of course are inserted before bolting the panel flanges together.

In addition to the above, clips such as indicated at 37 and 38 (see FIGURES 6, 7, 8 and 24) are secured to the flange joints by the bolts 27 for subsequent cooperation with the bolts 35 and 36 by which the lid and base are fastened to the side wall. If desired, the clips 37 and 38 may be applied sequentially to the several joints during the winding up of the side wall on the end closures as described above.

An assembly frame structure indicated generally by the letter D is fastened to one edge of the panel assembly as indicated in FIGURE 10. This assembly frame structure is built up in the form of a triangular truss and, as shown in FIGURES 20 to 23, the frame includes three cross braced longitudinal members 42—42 and 43, the latter of which is provided with a series of spaced lugs 44 arranged at appropriate intervals and apertured so as to cooperate with certain of the bolt holes in the panel flanges, as will clearly be seen from FIGURES 21 and 23. These lugs are temporarily fastened to the panel flange at one side of the assembly by means of bolts 45. In this way, the frame D braces the connected edge of the panel assembly.

Figures 21, 22, 23:
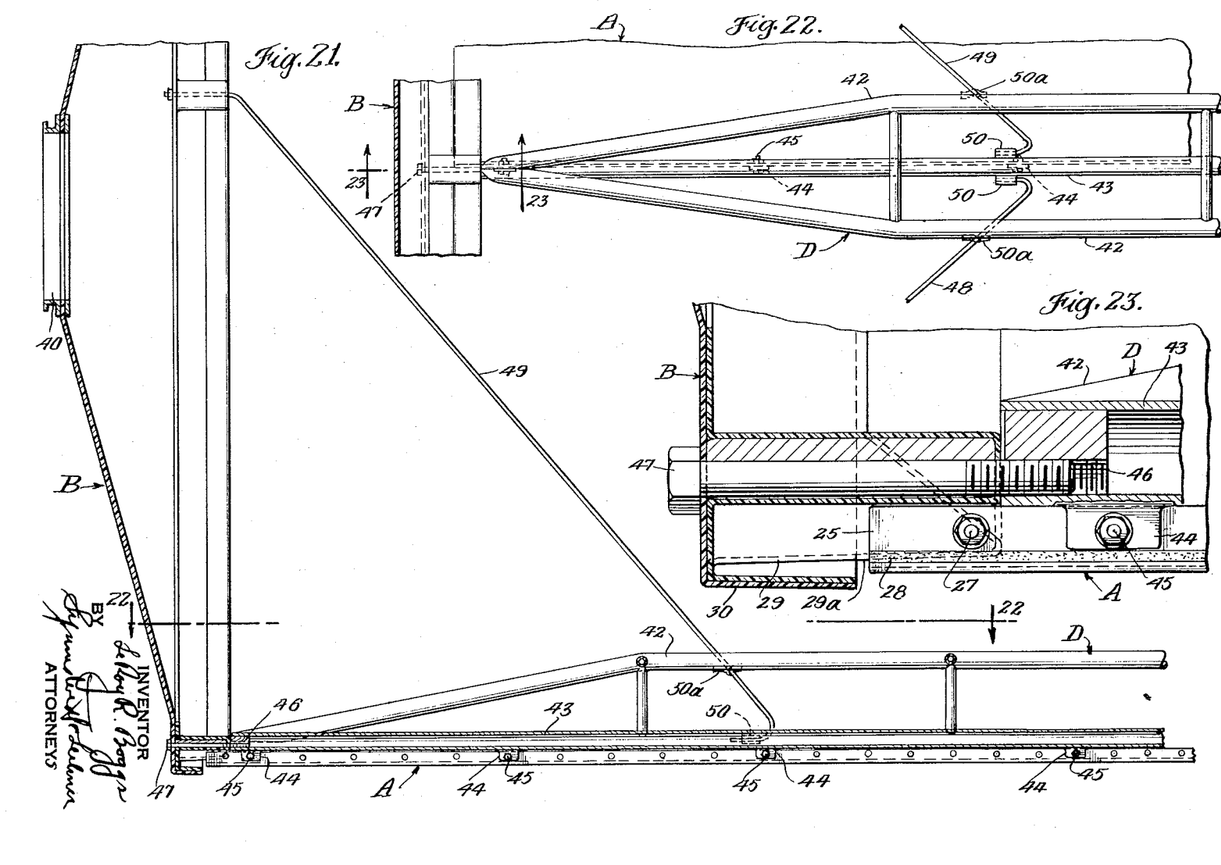
FIGURE 21 is a sectional view taken as indicated by the line 21—21 on FIGURE 20.
FIGURE 22 is a fragmentary sectional view on the line 22—22 of FIGURE 21.
FIGURE 23 is a view taken as indicated by the line 23—23 on FIGURE 22.

At opposite ends of the frame D a threaded socket 46 is provided for cooperation with temporary bolts 47 (see FIGURES 21, 22 and 23). These bolts are inserted after bringing the lid and base closure members to the ends of the frame D in the positions indicated in FIGURE 11, in which these closure members lie in planes paralleling the edges of the panel assembly at right angles to the edge which is connected to the frame D; and as indicated in FIGURES 21 to 23, the bolts 47 extend through the apertures formed in the end closure members for the permanent securing bolts (35 and 36). In this way the end closures are positioned with relation to the panel assembly for the side wall so that the generally cylindrical surfaces on the parts 29a and 32a overlie the edges of the panel assembly, as clearly appears in FIGURES 11 and 23.

The end closures B and C are then further secured in the positions just referred to by applying bent rods or stays 48 and 49. These stays or rods are fastened at one end to apertures in the end closures subsequently to be used for the permanent fastening bolts, and at the other ends to clips such as indicated at 50 on the frame structure D. Clips 50a on the longitudinal members 42—42 also aid in positioning the stays and thus the end closures.

With the parts now assembled as described above, the end closures and the frame, together with the connected edge of the panel assembly is rolled so as to flex or wind a portion of the panel assembly onto the surfaces 29a and 32a of the end closures. It will be noted from examination of FIGURE 11 that during the rolling operation the extending portions 29a and 32a of the lid and base act as shallow drum portions on which the panels are rolled or flexed, and that the edges of the wall elements 30 and 33 act as lateral guides for the rolling operation. The initial step of rolling is illustrated by the different angular positions represented in FIGURES 12 and 13. Specifically in FIGURE 13 the position is such that the first of the series of the 7 panels A has been flexed or rolled onto the end closures. At this time fastening bolts such as indicated at 35 and 36 are inserted through the lid and base and through the clips 37 and 38 at the point indicated at 51 in FIGURE 13, but these bolts are not completely tightened, being permitted to remain in about the condition indicated at the lower left hand corner of FIGURE 24.

Figure 14:
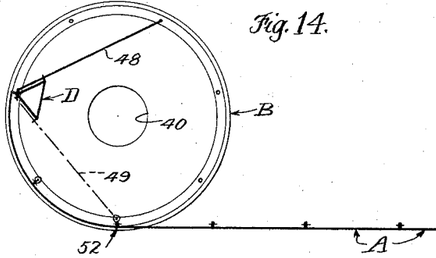

When this has been accomplished the end closures are further rolled up to the position indicated in FIGURE 14 and at that time the bracing stays 49 are removed and fastening bolts are inserted through the end closures and clips at the point marked 52 in that figure, here again the bolts being permitted to remain loose.

Figure 15:
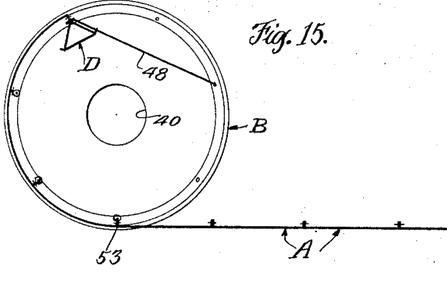
Figure 16:
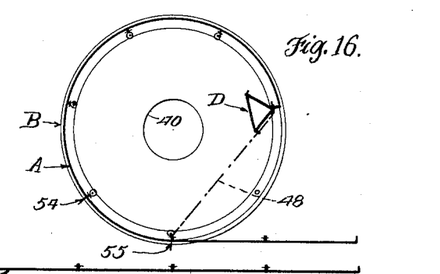
Figure 17:
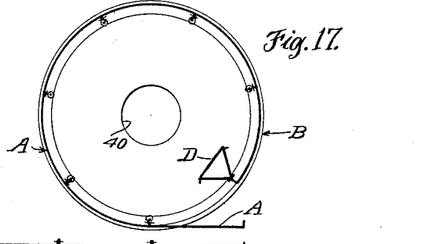

Further rolling motion of the end closures brings the parts to the position of FIGURE 15 in which additional bolts 35 and 36 are positioned in the parts at the point indicated at 53, and this is repeated for the joints indicated at 54 in FIGURE 16, which, as compared with FIGURE 15, shows the assembly rolled up to an extent equal to two panel widths, thus bringing point 55 to the bottom of the end closures. At this time the stays 48 are eliminated and bolts are inserted through the end closures and clips at 55. Winding progresses to the position indicated in FIGURE 17 in which bolts are inserted at 56.

Figure 18:
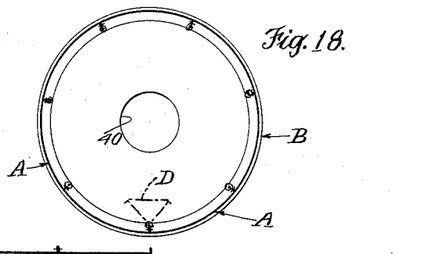

Finally in the position of FIGURE 18 additional bolts 27 are inserted through the panel flanges at the two free edges of the panel assembly. This serves to interconnect the two free edges of the panel assembly and at this time the lugs 44 of the temporary assembly frame D will lie between the adjoining panel flanges being interconnected. After insertion of some of the bolts 27 for interconnecting the panel flanges, but before drawing them home, the bolts 45 are removed so as to permit the frame lugs 44 to be withdrawn. The temporary bolts 47 at the ends of the frame D are then removed and the frame is thereby freed for complete separation from the structure of the silo itself, and the frame is withdrawn through the central opening or manhole 40 in the lid. The frame D may thereafter be employed in the assembly of another silo in another location.

After removal of the frame, the joint at the two free edges of the panel assembly may be tightened, bolts being inserted through all of the apertures provided, including those previously used for the bolts 45.

Clips 37 and 38 may then also be applied to this joint and the last set of permanent fastening bolts 35 and 36 inserted through the lid and base.

The parts are now ready for final fastening together and at this time the adhesive material is desirably introduced into the annular grooves in the lid and base, whereupon the nuts on the bolts 35 are tightened so as to draw the lid and the cylindrical wall of the silo together. Similarly the nuts on the bolts 36 are tightened so as to draw the base and the cylindrical wall together. In each instance this telescopes the adjacent end of the cylindrical wall into the annular groove provided in the lid or in the base and a tightly sealed joint is obtained by virtue of the presence of adhesive in the grooves. Additional adhesive may of course be applied after tightening home the permanent fastening bolts.

The action just described of telescoping the ends of the cylindrical wall into the grooves in the lid and the base will readily be understood from examination of FIGURE 24 which, at the lower left, illustrates the lid in position just prior to tightening the lid bolts 35 and in which at the lower right the base is shown in position after the nuts on bolts 36 have been tightened.

The slight taper or incline of the surfaces 29–29a and of the surface 32–32a on the lid and base respectively facilitate the telescoping of the ends of the cylindrical wall into the annular grooves and also enhance the making of a tight seal or joint between the end closures and the side wall.

The foregoing assembly technique is highly effective even in the handling of relatively large structures, it being possible for a silo of the character and dimensions hereinabove referred to to be readily assembled even by two or three men. It is also advantageous that relatively few and simple parts are needed by way of equipment in order to handle an assembly job, the temporary or assembly parts principally comprising the frame D and the stays such as indicated at 48 and 49, together with a few bolts.

The temporary or assembly parts, moreover, are of such shape as readily to be transported from site to site.

In addition to the convenience with which the assembly pieces may be handled and transported, it is pointed out that according to the present invention the end closures and the panels of which the side wall is made up may also be readily transported. Indeed a single truck may readily handle in one load not only a set of temporary assembly pieces but also end closures and sets of panels for construction of several silos.

After assembly, the silo may readily be positioned on end, for instance by means of a block and tackle.

The invention provides not only for great facility in the assembly or construction of the silo, but also enables use of the highly effective mass production technique referred to in the copending applications previously identified, according to which the panels for the side wall of the silo may readily be formed from thermosetting resin and fibrous mats, which are fed through a forming passage in a die or forming device in which the thermosetting resin is hardened or cured by application of heat, the formed article being pulled from the die by puller mechanism engaging the article beyond the delivery end of the forming device, in the manner described in said copending applications. It will be understood that the sectional shape of the die passage will conform with that of the panel being formed, including the flanged and reinforced marginal portions thereof, one of which is shown in FIGURE 25.

For reinforcement purposes, as already indicated above, glass fibers are preferred, and such fibers are advantageously used in the form of mats, i.e., matted or felted type of glass fiber material in which at least some of the fibers are of random orientation, such mats being a well known type of fibrous structure. If desired, the mats may contain some rovings extended in at least one direction, and woven fabrics made of glass fibers or yarns can also be used, at least for some layers or plies. In a typical construction, all of the plies, for instance all of those indicated diagrammatically in FIGURE 25 are advantageously formed of mat type of reinforcement containing at least a substantial quantity of randomly distributed fibers.

I claim:

1. A tank construction having a cylindrical wall formed of a plurality of panels each comprising a portion of the circumference of the cylindrical wall and each panel comprising a flat sheet flexed to conform to the curvature of the cylindrical wall with the several panels positioned in edge-to-edge relation to make up the complete cylindrical wall, adjacent panels having internally projecting flanges at their adjoining edges, fastening means cooperating with said flanges for joining the panels together, and an end structure for the tank having internal and external cylindrical portions adapted respectively to fit inside and outside the end of the cylindrical wall, the internal cylindrical portion having an external cylindrical surface of axial dimension to extend inside the cylindrical wall of the flexed panels farther than the axial extent of the external part.

2. A construction according to claim 1 in which the internal cylindrical portion of the end structure is provided with recesses adapted to accommodate the flange joints at the edges of the panels.

3. A tank construction having a cylindrical wall formed of a plurality of panels each comprising a portion of the circumference of the cylindrical wall and each panel comprising a flat glass fiber reinforced resin sheet flexed to conform to the curvature of the cylindrical wall with the several panels positioned in edge-to-edge relation to make up the complete cylindrical wall, adjacent panels having radially projecting flanges at their adjoining edges, fastening means cooperating with said flanges for joining the panels together, an end structure for the tank having an annular groove adjacent its periphery in which an end of the cylindrical wall is received and fitting the inside and the outside of the cylindrical wall, and adhesive fastening means in said groove serving to bond the end structure to the cylindrical wall.

4. A tank construction having a cylindrical wall formed of a plurality of panels each comprising a portion of the circumference of the cylindrical wall and each panel comprising a flat glass fiber reinforced resin sheet flexed to conform to the curvature of the cylindrical wall with the several panels positioned in edge-to-edge relation to make up the complete cylindrical wall, adjacent panels having radially projecting flanges at their adjoining edges, fastening means cooperating with said flanges for joining the panels together, and an end structure for the tank having an annular groove adjacent its periphery in which an end of the cylindrical wall is received and fitting the inside and the outside of the cylindrical wall, and having an annular surface projecting from the inside wall of said groove axially inside the cylindrical wall to an extent greater than the axial extent of the outside wall of said groove.

5. A construction according to claim 4 in which said projecting annular surface is inclined with respect to the axis of the tank in a direction to reduce the diameter of said annular surface toward its free edge.

6. A tank construction having a cylindrical wall formed of a plurality of panels each comprising a portion of the circumference of the cylindrical wall and each panel comprising a flat glass fiber reinforced resin sheet flexed to conform to the curvature of the cylindrical wall with the several panels positioned in edge-to-edge relation to make up the complete cylindrical wall, adjacent panels having radially projecting flanges at their adjoining edges, fastening means cooperating with said flanges for joining the panels together, and an end structure for the tank having an annular groove adjacent its periphery in which an end of the cylindrical wall is received and fitting the inside and the outside of the cylindrical wall, the inside wall of said groove being inclined with respect to the axis of the tank to provide an enlarged opening to said groove.

7. A tank construction having a cylindrical wall formed of a plurality of flat glass fiber reinforced resin panels flexed to conform to the wall curvature and positioned in edge-to-edge relation around the tank, adjacent panels having radially projecting flanges at their adjoining edges, said panels and their flanges incorporating glass fiber reinforcement mats, and the flanged portions incorporating plies of mats in addition to and overlapping those of the flat part of the panels, and fastening means cooperating with said flanges for joining the panels together.

8. A tank construction having a cylindrical wall formed of a plurality of flat glass fiber reinforced resin panels flexed to conform to the wall curvature and positioned in edge-to-edge relation around the tank, adjacent panels having radially projecting flanges at their adjoining edges, said panels and their flanges incorporating glass fiber reinforcement mats, the mats including at least one such mat extended throughout a major part of the main wall of each panel and with an edge portion extended into an edge flange of the panel and including at least one such mat extended in said edge flange and overlapping the first mat in an adjoining marginal portion of the main wall of the panel, and fastening means cooperating with said flanges for joining the panels together.

9. A tank construction having a cylindrical wall formed of a plurality of flat glass fiber reinforced resin panels flexed to conform to the wall curvature and positioned in edge-to-edge relation around the tank, adjacent panels having radially projecting flanges at their adjoining edges, said panels and their flanges incorporating glass fiber reinforcement mats, the mats including at least one such mat extended throughout a major part of the main wall of each panel and at least one such mat extended in said edge flange and overlapping the first mat in an adjoining marginal portion of the main wall of the panel, and fastening means cooperating with said flanges for joining the panels together.

10. A construction according to claim 9 and further including additional plies of mat in said panel flange, the thickness of the panel in the region of the overlap of the first and second mats referred to being greater than the major part of the main wall of the panel and the thickness of said flange being greater than that of said region of the overlap.

References Cited by the Examiner

UNITED STATES PATENTS

| | | | |
|---|---|---|---|
| 1,360,408 | 11/1920 | Johnson | 138—161 |
| 2,126,997 | 8/1938 | Kramer | 113—120 |
| 2,160,680 | 5/1939 | Sandberg | 113—120 |
| 2,729,313 | 1/1956 | Ernestas | 220—5 |
| 2,751,109 | 6/1956 | Moore | 220—81 |
| 2,823,826 | 2/1958 | Moore | 220—80 |
| 3,025,992 | 3/1962 | Humphrey | 220—5 |
| 3,043,465 | 7/1962 | Horner | 220—5 |
| 3,064,770 | 11/1962 | Andrews | 220—5 |

THERON E. CONDON, *Primary Examiner.*

EARLE J. DRUMMOND, *Examiner.*